(12) United States Patent
Scott (10) Patent No.: US 10,100,964 B1
(45) Date of Patent: Oct. 16, 2018

(54) PVC REPAIR PIPE AND METHOD OF USE THEREOF

(71) Applicant: William D. Scott, Sanger, CA (US)

(72) Inventor: William D. Scott, Sanger, CA (US)

( * ) Notice: Subject to any disclaimer, the term of this patent is extended or adjusted under 35 U.S.C. 154(b) by 367 days.

(21) Appl. No.: 14/664,747

(22) Filed: Mar. 20, 2015

Related U.S. Application Data (60) Provisional application No. 61/968,307, filed on Mar. 20, 2014.

(51) Int. Cl.
*F16L 55/17* (2006.01)

(52) U.S. Cl.
CPC ..................... *F16L 55/17* (2013.01)

(58) Field of Classification Search
CPC ...... F16L 55/1683; F16L 55/17; F16L 55/168
USPC .................. 138/99, 97; 285/15, 915
See application file for complete search history.

(56) References Cited

U.S. PATENT DOCUMENTS

| | | | | |
|---|---|---|---|---|
| 4,013,309 A | * | 3/1977 | Quick ..................... | F16L 47/20 285/133.21 |
| 4,357,960 A | * | 11/1982 | Han ..................... | F16L 55/1608 106/217.9 |
| 5,318,075 A | * | 6/1994 | Roll ..................... | F16L 55/11 138/89 |
| 5,778,935 A | * | 7/1998 | Koch ..................... | F16L 55/1608 138/109 |
| 6,619,326 B1 | * | 9/2003 | Pryne ..................... | F16L 55/1011 138/89 |
| 8,127,799 B2 | * | 3/2012 | Cortez ..................... | F16L 55/18 138/109 |
| 2008/0048435 A1 | * | 2/2008 | Sabastian ............... | F16L 21/002 285/15 |
| 2008/0252068 A1 | * | 10/2008 | Quinn ..................... | F16L 25/12 285/18 |
| 2010/0229990 A1 | * | 9/2010 | Cortez ................ | F16L 55/1608 138/97 |
| 2011/0048612 A1 | * | 3/2011 | Quinn ..................... | F16L 25/12 156/94 |

* cited by examiner

*Primary Examiner* — Patrick F Brinson
(74) *Attorney, Agent, or Firm* — Richard A. Ryan (57) ABSTRACT

A repair pipe and method for repairing a standard sized PVC pipe having a hole or other pipe damage so the PVC pipe can be used to transfer fluid. The repair pipe has a tubular body that is selected with a length to extend across a cutout section of the PVC pipe and an inside diameter only slightly larger than the outside diameter of the PVC pipe to provide a small gap between the two pipes. The method comprises the steps of sliding the repair pipe over one end of the PVC pipe to provide an exposed area at the end of the PVC pipe, placing adhesive on the exposed area and on the exposed area of the opposite end of the PVC pipe and then sliding the repair pipe across the cutout section to position the repair pipe over the glued areas of the PVC pipe.

13 Claims, 6 Drawing Sheets

PVC REPAIR PIPE AND METHOD OF USE THEREOF

CROSS-REFERENCE TO RELATED APPLICATIONS

This patent application claims priority to U.S. Provisional Application Ser. No. 61/968,307 filed Mar. 20, 2014.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to PVC pipes used to transport fluid and installations using such pipes, including water irrigation and sprinkler systems. In particular, the present invention relates to devices, systems and methods that are utilized to repair leaks, breaks or other failure of a pipe that results in undesirable loss of fluid therefrom. Even more particularly, the present invention relates to such devices, systems and methods that allow the user thereof to quickly, easily and relatively inexpensively repair such pipe failures.

B. Background

Piping systems are commonly utilized to contain, transport and direct fluid from a central location to areas where the fluid is beneficially utilized. The typical fluid piping system comprises a central control apparatus that directs and regulates the fluid into the piping system so the fluid can be delivered to where it is needed for the intended use of the piping system. A common example of a fluid piping system is an irrigation system which is utilized to transport water to an area having trees, bushes, vines, grass or other vegetation that requires the water to survive and thrive. Such areas may be an agricultural area that is utilized to commercially grow crops or it may be a non-agricultural area that has vegetation which is primarily utilized for landscaping, including lawns, fields and the like at a home, school, business or other location. Irrigation piping systems, whether used for agricultural or non-agricultural purposes, generally comprise sections of pipe that are buried under the surface of the ground and a plurality of water delivery apparatuses that direct the water from the pipe to the vegetation which needs the water. Typical water delivery apparatuses, which in any particular irrigation system may be utilized separately or in combination with each other, include sprinklers, sprayers, bubblers, drip emitters and the like.

As is well known in the art, most irrigation piping systems comprise a plurality of pipes that are buried under the surface of the ground in a pattern that is designed to allow the various water delivery apparatuses to effectively cover the area to be irrigated and efficiently deliver the water to the vegetation. These patterns may be of virtually any shape, depending generally on the size and shape of the area being covered. Typically, the pipes utilized in irrigation piping systems are elongated tubular members (pipes) having a generally circular cross section. Although a wide variety of different materials may be utilized for the pipes in an irrigation piping system, a very common material is PVC. In fact, for residential and other non-agricultural systems (including schools, parks, businesses and the like), PVC pipes are likely the most common pipe material for the piping system. Many agricultural irrigations systems also utilize PVC pipes.

One common problem with most irrigation systems is that one of the PVC pipes may develop a hole in the sidewall of the pipe or break, sometimes completely across the diameter of the pipe. These holes or breaks may result from contact with equipment utilized by persons taking care of the vegetation or from a defect in the pipe. Naturally, such holes or breaks in the pipe will result in loss of water to the ground around the pipe. In addition to wasting water, the loss of water through the pipe reduces pressure to the water delivery apparatuses in the piping system, and therefore results in less water to the vegetation, and typically causes damage to the soil around the leak. As such, it is generally advisable that any leak in a pipe of the irrigation system be fixed as soon as possible.

Most agricultural operations have people, whether employees or contract people, whose job is to maintain the irrigation system, including repairing any leaks as soon as they are discovered. Many schools, parks, businesses and the like also have employees or contract people who repair leaks in the piping system. In contrast, most homeowners and renters either must fix the leak themselves or call an irrigation repair service to come out and fix the leak. Whether an employee, contractor or user fixes the leak, he or she must first remove the soil and any vegetation from above and around the leaking pipe to access the hole or break, repair the hole or break so water will no longer leak out and then re-cover the pipe with soil and, as applicable, vegetation. This takes time and, depending on the size of the leak, will result in costs to repair the leak. For many people who are not familiar with such repairs, this task can seem somewhat difficult.

A number of devices are available to assist people with repairing holes and breaks in PVC pipes that are utilized as part of an irrigation system. These devices include such items as compression fittings, extension fittings, flexible couplings and hole repair kits, such as the Snap-Fix (available from King Brothers, Inc.) and the like. Although the presently available devices are generally sufficient at repairing the types of pipe failures, such as holes or breaks, for which they are designed to repair, some of the devices are relatively costly and/or somewhat difficult to use. Compression fittings can cost $3.50 or more, extension fittings can cost $4.00 or more and flexible couplings can be $6.00 or more. The Snap-Fix repair coupling, which is only suitable for repairing a hole in a pipe, typically costs approximately $2.00 for each device. What is needed, therefore, is an easier to use and less expensive device for repairing leaks in a PVC irrigation piping system. The improved PVC repair device should be configured to allow the user thereof to quickly and relatively inexpensively repair a section of PVC pipe that is leaking water as a result of a hole or break in the pipe. Preferably, the new PVC repair device is simple enough for even a person who lacks experience in such repairs to quickly and easily accomplish the necessary repair work.

SUMMARY OF THE INVENTION

The PVC repair pipe and method of the present invention provides the benefits and solves the problems identified above. That is to say, the present invention is directed to a device, system and method for repairing PVC pipe in an irrigation piping system. The PVC repair pipe and method of the present invention are configured for use to repair a section of PVC pipe which has either a hole or a break therein. The new PVC repair pipe and method of the present invention is inexpensive to manufacture, easy to use and effective at repairing holes and/or breaks in a PVC pipe. As will be readily appreciated by those skilled in the art, the PVC repair pipe and method of the present invention are readily adaptable to all different sizes and uses of PVC pipe, including PVC pipe that is buried underground as part of an irrigation piping system that delivers water to vegetation by way of one or more water delivery apparatuses. The PVC repair pipe and method of the present invention will be able to be utilized by persons who are experienced in repairing PVC pipe and by those who are repairing a hole or break in a PVC pipe for the first time.

In the preferred embodiments of the present invention, the PVC repair pipe generally comprises an elongated tubular body having a first end, a second end, an inside diameter and a repair length defined between the first end and the second end of the repair pipe. The inside diameter of the repair pipe is selected so as to be only slightly greater than an outside diameter of the PVC pipe that is to be repaired to provide a gap between the repair pipe and the PVC pipe, with the PVC pipe having a standard nominal size with an outside diameter associated with the standard nominal size of the PVC pipe. The repair length of the repair pipe is selected to exceed the length of a cutout section, which is the portion of the PVC pipe removed around the hole, break, slit, crack or other pipe damage, to provide a first overlap section at the first end of the PVC pipe and a second overlap section at the second end of the PVC pipe. In one embodiment, the gap is approximately 1/32 of an inch. If desired, the repair pipe can have a marking device on an outer surface of the tubular body of the repair pipe that is selected to identify the standard nominal size of the PVC pipe for which the repair pipe is to be utilized. The marking device can be a colored strip, colored outer surface of the repair pipe or the like. In another embodiment, the repair pipe can have a gripping element, such as grip tape or an integral feature, on an outer surface of the tubular body.

In one of the preferred embodiments of the present invention, the method of repairing PVC pipe generally comprises the steps of (a) accessing the pipe damage of the PVC pipe to be repaired, with the PVC pipe having a standard nominal size with an outside diameter associated with the standard nominal size of the PVC pipe; (b) cutting the PVC pipe near the pipe damage to obtain a cutout section, with the cutout section defining a first end of the PVC pipe in spaced apart relation to a second end of the PVC pipe; (c) cleaning, as may be necessary, the first end and the second end of the PVC pipe to remove any burs or the like; (d) providing a repair pipe having an elongated tubular body with repair length defined by a first end and a second end thereof, the repair length being selected to exceed the cutout section plus a first overlap length at the first end of the PVC pipe and a second overlap length at the second end of the PVC pipe, with the tubular body having an inside diameter that is selected to be only slightly greater than the outside diameter of the PVC pipe to provide a gap between the repair pipe and the PVC pipe; (e) placing the first end of the tubular body of the repair pipe over an outer surface at the first end of the PVC pipe; (f) sliding the repair pipe along the outer surface of the PVC pipe until the second end of the tubular body is slid past the first end of the PVC pipe to provide an exposed area at the first end of the PVC pipe; (g) applying an adhesive to all or part of the exposed area to define a glued area of the PVC pipe; (h) applying the adhesive to an exposed area at the second end of the PVC pipe to define a glued area at the second end of the PVC pipe; (i) sliding the repair pipe along the first end of the PVC pipe toward the second end of the PVC pipe until the repair pipe extends across the cutout section and over the glued area at the second end of the PVC pipe; and (j) positioning the repair pipe relative to the PVC pipe so a first overlap section of the repair pipe is over the glued area at the first end of the PVC pipe and a second overlap section of the repair pipe is over the glued area at the second end of the PVC pipe. The repair pipe can be modified as described above to include a marking device and/or a gripping element.

Accordingly, the primary objective of the present invention is to provide a PVC repair pipe and method of using the repair pipe to repair a PVC pipe that has the various advantages discussed above and elsewhere in this disclosure and which is able to overcome the various disadvantages and limitations associated with the prior art devices and methods of repairing a PVC pipe.

An important aspect of the present invention is that it provides a PVC repair pipe for repairing a broken or otherwise damaged PVC pipe in a manner that quickly, easily and inexpensively places the PVC pipe back in condition for its intended use.

Another important aspect of the present invention is that it provides a PVC repair pipe that is sized to be utilized with a damaged PVC pipe having a standard nominal size and an outside diameter that is associated with the standard nominal size of the PVC pipe.

Another important aspect of the present invention is that it provides a PVC repair pipe having tubular body with an inside diameter which is only slightly larger than the outside diameter of a PVC pipe having a hole, split, crack, break or other pipe damage, with the PVC pipe having a standard nominal size so as to provide a small gap between the inside diameter of the repair pipe and the outside diameter of the nominally sized PVC pipe.

Another important aspect of the present invention is that it provides a new method of repairing a broken or otherwise damaged PVC pipe comprising the steps of sliding the repair pipe over the cut ends of the PVC pipe having glued areas with an adhesive thereon to allow the user to quickly and easily repair the damaged PVC pipe.

Yet another important aspect of the preferred embodiments of the present invention is that it provides a new PVC repair pipe and method of using such a pipe which is easy to use and relatively inexpensive to manufacture.

The present invention achieves the objectives set forth above and elsewhere herein. The various aspects of the present invention that are described above are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are generally illustrative of a preferred embodiment of the present invention and are included to represent at least one way of configuring the present invention. Although specific components, materials, configurations and uses are described and/or illustrated, it should be understood that a number of variations to the components and to the configuration of those components described herein and shown in the figures can be made without changing the scope and function of the invention set forth herein. For instance, although the description and figures included herewith generally describe and show a particular size and configuration for the existing pipe and the repair pipe of the present invention, these are only shown for exemplary purposes in order to better show and explain the present invention. Persons skilled in the relevant art will readily appreciate that the present invention is not limited to the configuration of the various components shown or described herein.

Figure 2:
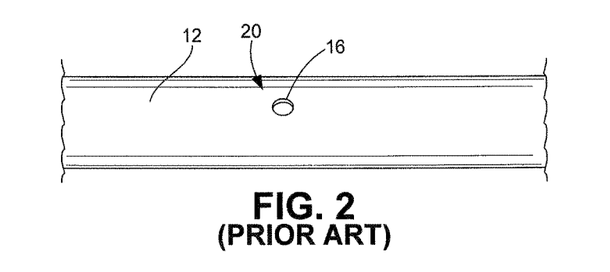
FIG. 2 is a side view of a prior art section of pipe having a hole therein.
Figure 3:
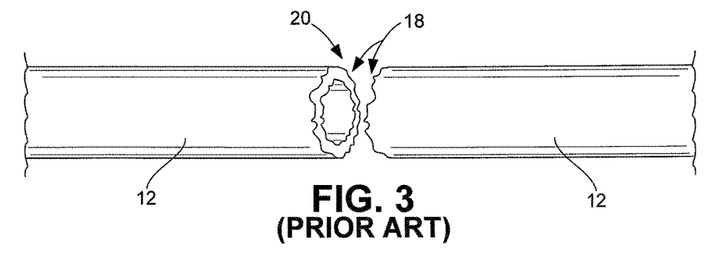
FIG. 3 is a side view of a prior art section of pipe with a break therein.
Figure 11:
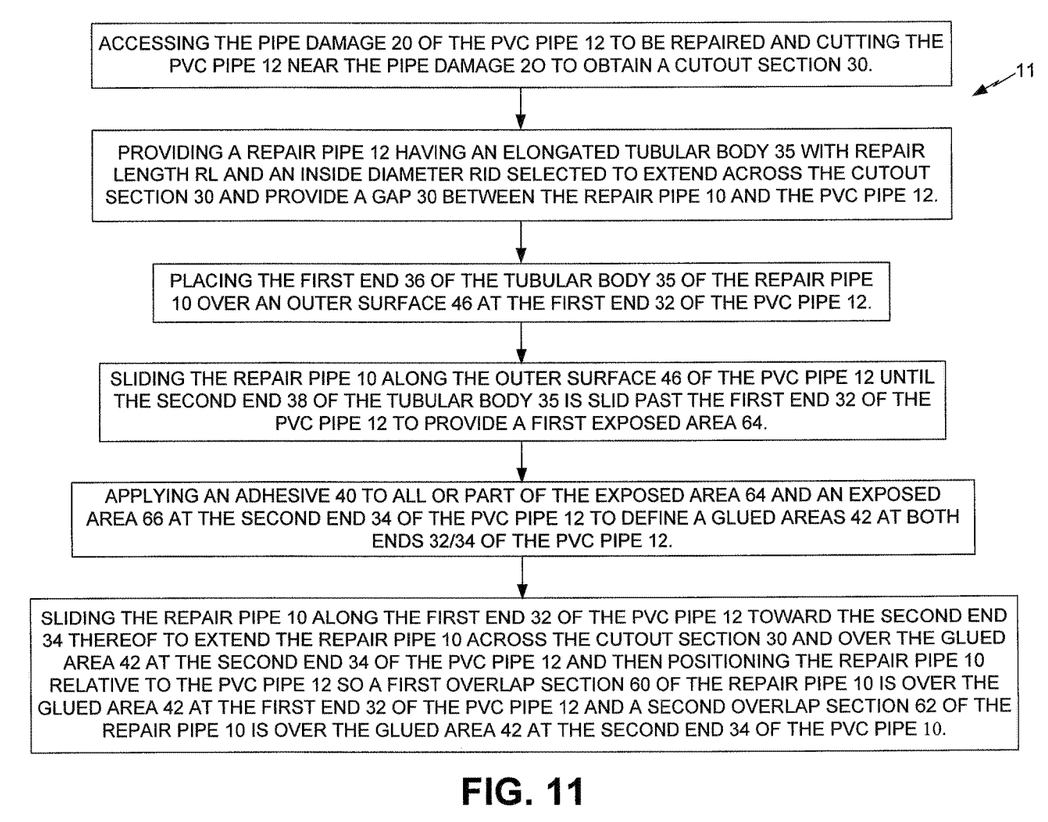
FIG. 11 is a flow chart summarizing the method of the present invention.

A PVC repair pipe that is configured pursuant to one of the preferred embodiments of the present invention is shown generally as 10 in FIGS. 5-8. A new method using the PVC repair pipe is shown generally as 11 in FIG. 11. As set forth in more detail below, the repair pipe 10 of the present invention is sized and configured to repair an existing PVC pipe 12 of an irrigation piping system 14 that has developed a hole 16 (FIG. 2) or break 18 (FIG. 3) in the PVC pipe 12, as shown with regard to the prior art piping system 14 of FIG. 1. For purposes of disclosing the present invention, a hole 16, break 18 or any other damage to the PVC pipe 12 that results in undesired flow of fluid out of the PVC pipe 12, such as a split, crack or the like, or which prevents fluid from freely passing through the PVC pipe 12, such as blockage resulting from debris in the PVC pipe 12 or root growth through the PVC pipe 12, is collectively referred to as pipe damage 20.

Figure 1:
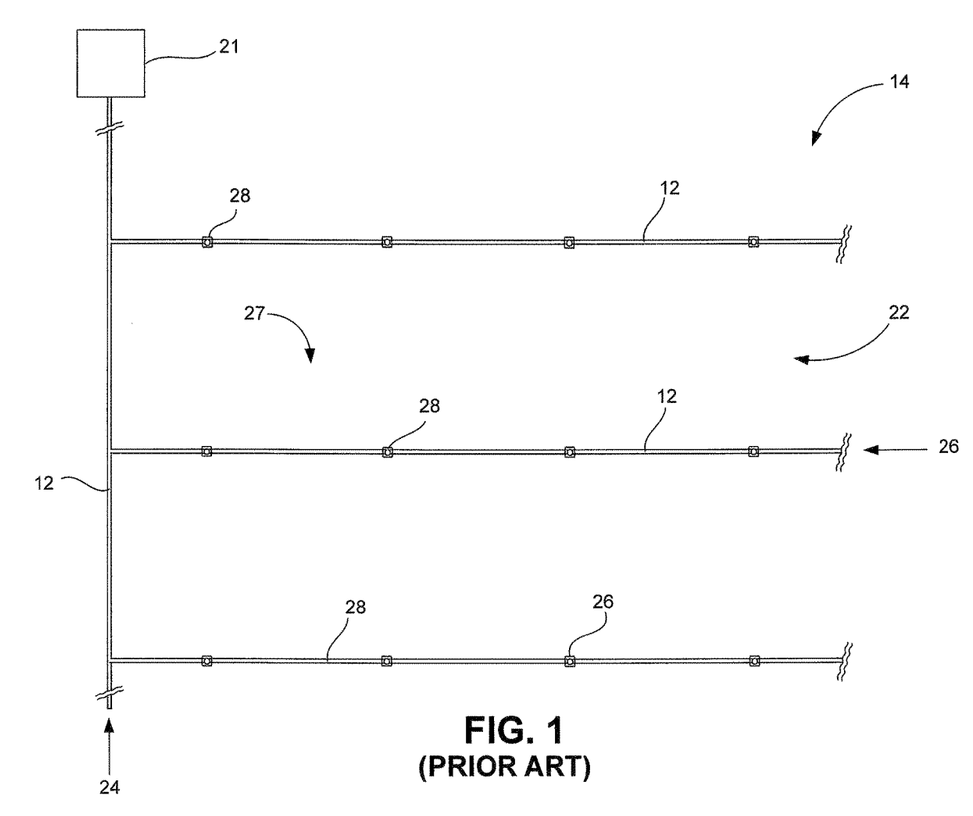
FIG. 1 is a top plan view of a typical prior art irrigation piping system having primary and secondary pipes connected to a plurality of water delivery apparatuses.

A typical prior art irrigation piping system 14, whether used for agricultural or non-agricultural purposes, has a control apparatus 21 that controls the flow of water to a vegetation area 22 having trees, plants, grass and/or other vegetation through one or more primary irrigation lines 24 and one or more secondary irrigation lines 26 that each comprise sections of PVC pipe 12 that are, often but not always, buried under the surface of the ground, shown as 27 in FIG. 1, and a plurality of water delivery apparatuses 28 hydraulically connected to the PVC pipe 12 that direct the water from the PVC pipe 12 to the vegetation in the vegetation area 22. Typical water delivery apparatuses 28, which in any particular irrigation system may be utilized separately or in combination with each other, include such devices as sprinklers, sprayers, bubblers, drip emitters and the like. As set forth above, at any given point in time one or more of the sections of existing PVC pipe 12 can develop a hole 16 or break 18 therein that results in the loss of water through the hole 16 or break 18 to the ground 27 around the area of the hole 16 or break 18 in the PVC pipe 12, which wastes water and usually results in damage to the soil and vegetation in that area.

Figure 4:
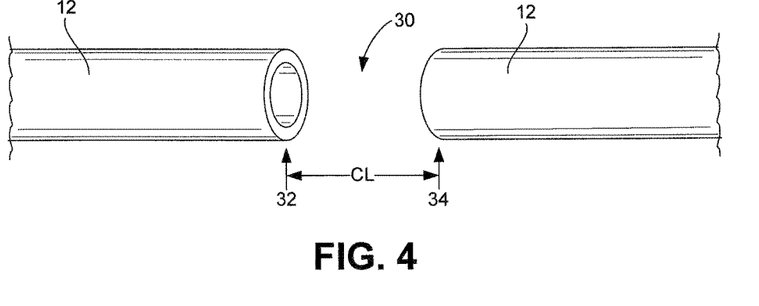
FIG. 4 is a side view of a section of pipe having the pipe around the hole or break removed to form a cutout section to present clean opposing ends of the pipe for use with the repair pipe of the present invention.
Figure 5:
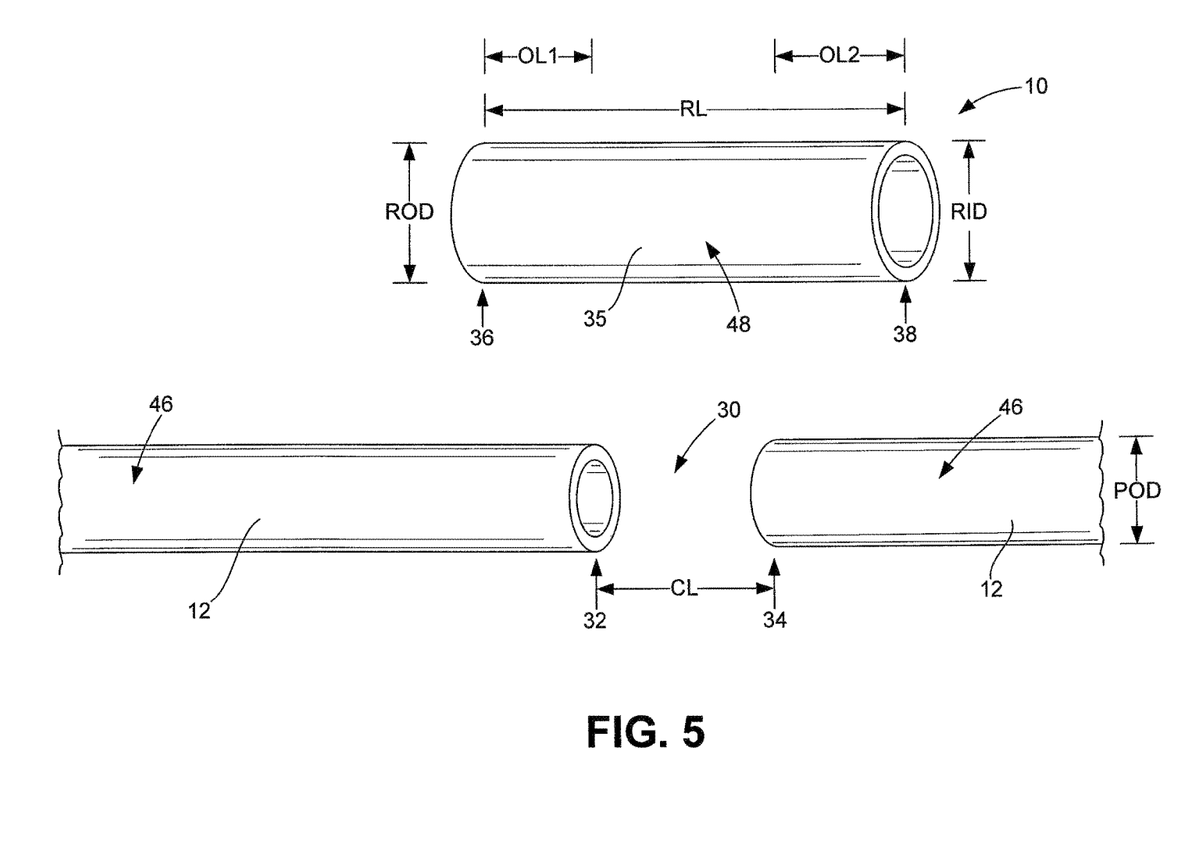
FIG. 5 is a side view of the repair pipe of the present invention shown positioned above the cutout section.

To utilize the repair pipe 10 of the present invention, the user must first access the pipe damage 20 in the PVC pipe 12. For above ground piping systems 14, the user often only has to walk up to the area where the pipe damage 20 exists to see where the pipe damage 20 is located. In other circumstances, the user will have to clear the weeds, grass or other unwanted vegetation in the area around the pipe damage 20 and/or to get to the PVC pipe 12 where the pipe damage 20 is located. For piping systems 14 having the PVC pipe 12 under the ground 27, the user first digs a hole in the ground 27 around where the PVC pipe 12 is leaking or otherwise damaged to gain access to the PVC pipe 12. As with the prior art repair devices, the user will need to remove a sufficient amount of soil around a portion of the PVC pipe 12 having the pipe damage 20, such as the hole 16 or break 18, therein to access to the PVC pipe 12 and utilize the repair pipe 10 of the present invention. Once the access to the PVC pipe 12 is achieved, the user cuts the PVC pipe 12, using a saw, knife or other tool as may be appropriate for the material of the PVC pipe 12, to obtain a cutout section 30 in the PVC pipe 12, as shown in FIGS. 4-7, where the hole 16 or break 18 was previously located to provide two opposite facing ends, shown as a first end 32 and a second end 34, of PVC pipe 12. The distance between the first end 32 and second end 34 define the cutout section 30 and the cutout length CL, as best shown in FIGS. 4 and 5. The first 32 and second 34 ends of the PVC pipe 12 should be cleaned, as may be necessary depending on the cutting process, by scraping, filing, sanding or the like, to ensure that the ends 32/34 are relatively free of burrs and other edge materials to allow the repair pipe 10 of the present invention to be effectively utilized. The portion of the PVC pipe 12 that represents the cutout section 30 can be discarded.

Once the cutout section 30 is obtained, the user selects a repair pipe 10 having a tubular body 35 of the appropriate length and size, as set forth in more detail below, to repair the PVC pipe 12 so that the irrigation piping system 14 can be utilized to provide water to the desired irrigation area 22 without the loss of water or blockage from the pipe damage

Figure 7:
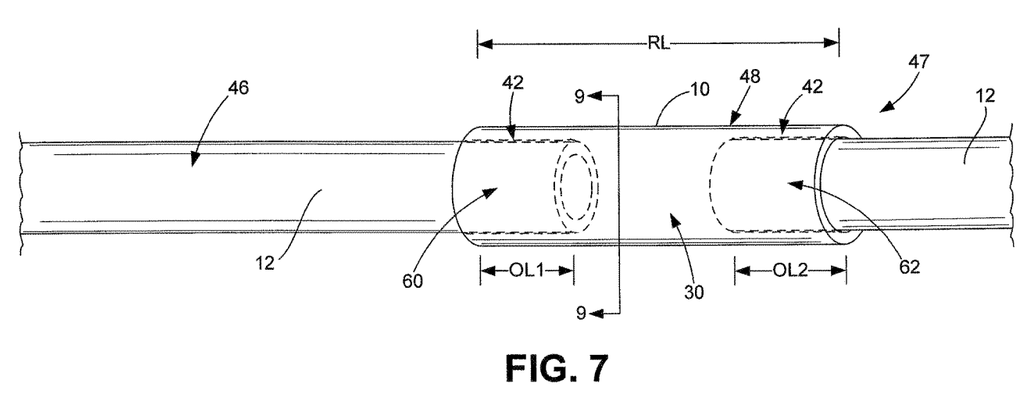
FIG. 7 is a side view of the repair pipe shown slid back across the cutout section and over the two ends of the existing pipe to repair the pipe.
Figure 8:
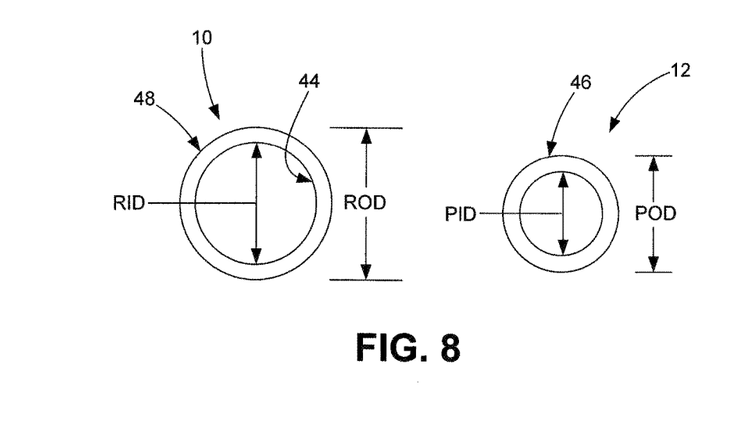
FIG. 8 is an end view of both the repair pipe and the existing pipe to show the contrast thereof.

20. The user selects a repair pipe 10 having a tubular body 35 that is of the appropriate length, shown as RL, and repair inside diameter RID to be utilized with the PVC pipe 12, having a pipe outside diameter POD, to extend across the length CL of the cutout section 30 with sufficient overlap length OL, as best shown in FIGS. 5, 7 and 8. The tubular body 35 of repair pipe 10 has a first end 36 and a second end 38 that defines the repair length RL of the repair pipe 10. The overlap length OL is that portion of the repair pipe 10 that will extend over the PVC pipe 12 at each of the first end 32 and second end 34 of the PVC pipe 12 when the repair pipe 10 is positioned on the PVC pipe 12, as shown in FIG. 8. The first overlap length OL1 is the distance between the first end 32 of the repair pipe 10 and the first end 36 of the PVC pipe 12 to be repaired (namely, where the cut was made) and the second overlap length OL2 is the distance between the second end 34 of the repair pipe 10 and the second end of the PVC pipe 12 where the cut was made, as shown in FIGS. 5 and 7. The first overlap length OL1 defines a first overlap section 60 at the first end 36 of the tubular body 35 of repair pipe 10 and the second overlap length OL2 defines a second overlap section 62 at the second end 38 of the tubular body 35 of repair pipe 10, as shown in FIG. 7. Typically, a first overlap length OL1 and a second overlap length OL2 of approximately one inch will be sufficient. The length RL of the tubular body 35 of repair pipe 10 is the length CL of the cutout section 30 plus the first overlap length OL1 of the first overlap section 60 and the second overlap length OL2 of the second overlap section 62.

Figure 9:
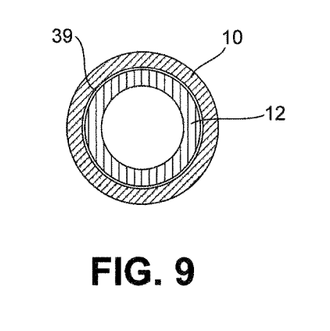
FIG. 9 is a cross-sectional end view of the repair pipe joined to the pipe taken through lines 9-9 of FIG. 7 shown without the PVC adhesive between the two pipes to show the gap formed therebetween.

As will be readily appreciated by persons skilled in the art, the inside diameter RID of the tubular body 35 of repair pipe 10 must be greater than the pipe outside diameter POD of PVC pipe 12, as shown in FIGS. 8 and 9. The outside diameter POD of the PVC pipe 12 will be that which is associated with one of the standard sizes of PVC pipe 12 utilized for transporting fluids, particularly liquids such as water in an irrigation system 14. As well known in the art, the standard sizes of PVC pipe 12 are provided in standard nominal inside diameter dimensions of ¼", ⅜", ½", ⅝", ¾", 1" and so on. The standard pipe sizes of PVC pipe 12 have a wall thickness suitable to provide the a desired maximum pressure for the fluid in the PVC pipe 12. The inside diameter PID plus twice the wall thickness will result in the actual pipe outside diameter POD. The pipe outside diameter POD for these standard, nominally sized pipes 12 are also standardized throughout the relevant industry. For purposes of disclosing the present invention, these standard sized pipes 12 are collectively referred to as being of a "standard nominal size" or SNS. The repair pipe 10 is specially sized to be received over the pipes 12 having a pipe outside diameter POD that is in corresponding relation to the standard nominal size SNS of the PVC pipe 12. The difference between the pipe outside diameter POD of PVC pipe 12 of the standard nominal size SNS and the repair inside diameter RID of the repair pipe results in a gap 39 between the repair pipe 10 and the water PVC pipe 12, as shown in FIG. 9. To best achieve the benefits of the present invention, the gap 30 should be relatively small, such as approximately ¹⁄₃₂ inch.

Figure 6:
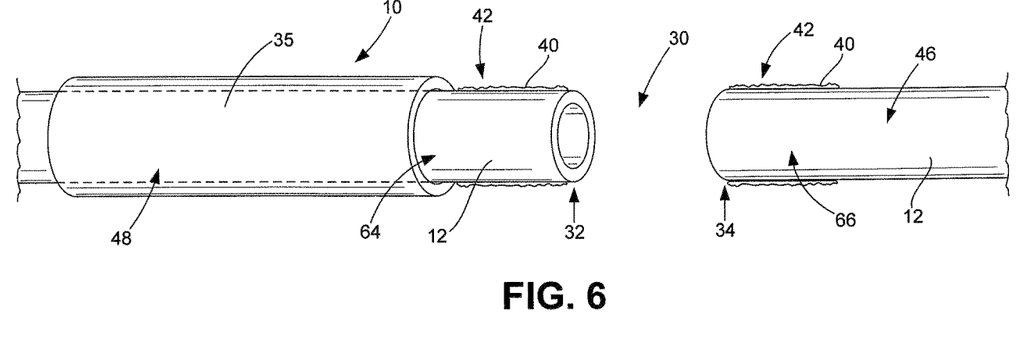
FIG. 6 is a side view of the repair pipe slid onto and past one end of the existing pipe with PVC adhesive placed near the two ends of the existing pipe.

In the embodiment shown in the figures, the first end 36 of the repair pipe 10 is placed on the first end 32 of the PVC pipe 12 and the repair pipe 10 is slid along the outer surface 48 of the PVC pipe until the second end 38 of the tubular body 35 of repair pipe 10 is slid past the first end 32 of the PVC pipe to provide a first exposed area 64 at the first end 32 of the PVC pipe 12, as shown in FIG. 6. As also shown in FIG. 6, the second end 34 of the PVC pipe 12 has a second exposed area. A suitable amount of PVC adhesive 40, the formulation and use thereof are well known by persons skilled in the art, is placed on the first exposed area 64 at the first end 32 of the PVC pipe 12 and on the second exposed area 66 near the second end 34 of the PVC pipe 12 defining a glued area 42 at each end 32/34 of the PVC pipe 12, as shown in FIGS. 6 and 7. Preferably, the glued area 42 of PVC pipe 12 at each of the first 32 and second 34 ends of the PVC pipe 12 should be slightly less than or approximately the same as the first OL1 and second OL2 overlap lengths of, respectively, the first overlap section 60 and the second overlap section 62. The amount of the PVC adhesive 40 should be sufficient to completely bind the repair pipe 10 to PVC pipe 12 such that they effectively become a single hydraulic unit that will not leak water or other fluid therefrom when the irrigation piping system 14 is again utilized to deliver water to the vegetation area 22. Typically, the PVC adhesive 40 at glued areas 42 will at least substantially encircle the PVC pipe 12 at and near the ends 32 and 34 thereof so it will circumferentially bind the outside of the PVC pipe 12 with the interior of the repair pipe 10.

After applying the PVC adhesive 40, the repair pipe 10 is slid back completely over the cutout area 30 to the second end 34 of the PVC pipe 12 such that the second end 38 of the repair pipe 10 is positioned past the glued area 42 near the second end 34 of the PVC pipe 12. The user then adjusts, as necessary, the position of the repair pipe 10 such that the first overlap section 60 is over the glued area 42 at the first end 32 of the PVC pipe 12 and the second overlap section 62 is over the glued area 42 at the second end of the PVC pipe 12. The length RL of the repair pipe 10 should be such that the first end 36 of the repair pipe 10 will remain positioned past the glued area 42 near the first end 32 of the PVC pipe 12 so the repair pipe 10 covers the cutout area 30, both ends 32/34 of the PVC pipe 12 and both glued areas 42 of the two ends 32/34 of the PVC pipe 12, as shown in FIG. 7. The repair pipe 10 is then allowed to dry in position on the PVC pipe 12 to bind the repair pipe 10 to the PVC pipe 12 and place the PVC pipe 12 in useable condition. The above method 11 is summarized in FIG. 11.

In the preferred embodiment of the present invention, the repair pipe 10 is made out of the same PVC material which is utilized for the PVC pipe 12 and the PVC adhesive 40 is selected to chemically bind, typically by melting, the inner wall 44 (shown in FIG. 8) of the repair pipe 10 to the outer wall 46 (FIG. 8) of the PVC pipe 12 at the glued areas 42 so that no leaks will occur between the ends 36/38 of the repair pipe 10 and the PVC pipe 12 when water (or other fluid) flows through the piping system 14. Because the inside diameter RID of the tubular body 35 of repair pipe 10 is larger (though only slightly) than the outer diameter POD of the PVC pipe 12, the repair pipe 10 is loose enough so the repair pipe 10 will slide over the PVC pipe 12, even with the PVC adhesive 40 on the glued areas, but tight enough such that the PVC adhesive 40 will be able to chemically bind the repair pipe 10 to the PVC pipe 12 when the repair pipe 10 is in the repair position 47, shown in FIG. 7. In a preferred embodiment, the difference between the outside diameter POD of the PVC pipe 12 and the inside diameter RID of the repair pipe 10 is approximately ¹⁄₃₂ of an inch or less. Unlike the prior art couplings that are tapered on the inside diameter such that they narrow towards the middle of the coupling or which have stop rings disposed in the middle of the coupling, the repair pipe 10 of the present invention must have the same inside diameter RID all the way through the entire length RL of the repair pipe 10 so the repair pipe 10 can completely slide onto one end, such as the first end 32, of the PVC pipe 12 (as shown in FIG. 6) prior to placing the PVC adhesive 40 on the ends 32/34 of the PVC pipe 12. This has the advantage of being less expensive to manufacture and much easier to use. In addition, the repair pipe 10 can be provided in a wide range of lengths, including the standard lengths commonly utilized for the PVC pipe 12 itself, and then cut to size by the user as he or she needs it to expand across the cutout length CL. Such lengths RL may be several inches to many feet.

Figure 10:
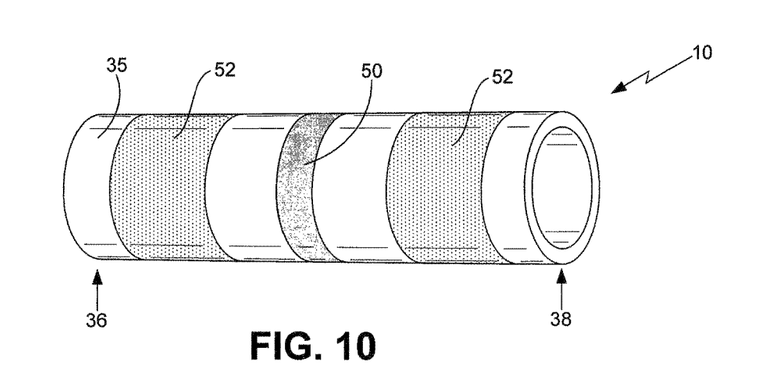
FIG. 10 is a side view of a repair pipe of the present invention shown with a marking device and gripping elements.

If desired, the outer surface 48 of the repair pipe 10 can be colored or otherwise marked with a marking device 50 to indicate to the user what size of PVC pipe 12 the repair pipe 10 is sized to be utilized with so the user will not attempt to place a repair pipe 10 having too small or too large of an inside diameter RID on the outer diameter POD size of the existing PVC pipe 12. In one embodiment, the marking device 50 can be a color strip, shown in FIG. 10, on the outer surface 48 of the tubular body 35. Alternatively, the marking device 50 can be all or part of the outer surface 48 of the tubular body and/or the ends 36/38 thereof being colored. As will be readily appreciated by those skilled in the art, a wide variety of marking devices 50 can be utilized to clearly indicate to the user the repair pipe 10 he or she should use. The outer surface 48 of the tubular body 35 of repair pipe 10 can be provided with a gripping element 52 that is attached to or integral with the outer surface 48 of the tubular body 35 of repair pipe 10. In one embodiment, the gripping element 52 can be similar to the tape materials utilized with weight lifting equipment, grips and other items. In another embodiment, the gripping element 52 can be integrally formed with the outer surface 48 of tubular body 35. As will be readily appreciated by persons skilled in the art, a wide variety of different types of gripping materials or configuration are likely to be suitable for use as the gripping element 52 on the outer surface 48 of the repair pipe 10.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A repair pipe for use to repair a PVC pipe having a standard nominal size, said PVC pipe having a cutout section associated therewith, said cutout section defining a first end and a second end of the PVC pipe, said repair pipe comprising an elongated tubular body having a first end, a second end, an inside diameter and a repair length defined between said first end and said second end of said repair pipe, said inside diameter selected so as to be only slightly greater than an outside diameter of the PVC pipe so as to provide a gap between said repair pipe and the PVC pipe, said repair length selected so as to exceed the cutout length of the cutout section and provide a first overlap section at the first end of the PVC pipe and a second overlap section at the second end of the PVC pipe, said repair pipe further comprising a gripping element attached to or integral with an outer surface of said tubular body of said repair pipe.

2. The repair pipe of claim 1, wherein said gap is approximately 1/32 of an inch.

3. The repair pipe of claim 1 further comprising a marking device on an outer surface of said tubular body of said repair pipe, said marking device selected so as to identify the standard nominal size of the PVC pipe for which said repair pipe is to be utilized.

4. A method of repairing pipe damage in a PVC pipe having a standard nominal size with an outside diameter associated with the standard nominal size of the PVC pipe, said method comprising the steps of:
   a) cutting the PVC pipe near the pipe damage to obtain a cutout section, said cutout section defining a first end of the PVC pipe in spaced apart relation to a second end of the PVC pipe;
   b) providing a repair pipe having an elongated tubular body with repair length defined by a first end and a second end thereof, said repair length selected so as to exceed said cutout section plus a first overlap length at the first end of the PVC pipe and a second overlap length at the second end of the PVC pipe, said tubular body having an inside diameter selected so as to be only slightly greater than the outside diameter of the PVC pipe so as to provide a gap between said repair pipe and the PVC pipe;
   c) placing said first end of said tubular body of said repair pipe over an outer surface at the first end of the PVC pipe;
   d) sliding said repair pipe along the outer surface of the PVC pipe until said second end of said tubular body is slid past the first end of the PVC pipe to provide an exposed area at the first end of the PVC pipe;
   e) applying an adhesive to all or part of said exposed area to define a glued area of the PVC pipe;
   f) applying said adhesive to an exposed area at the second end of the PVC pipe to define a glued area at the second end of the PVC pipe;
   g) sliding said repair pipe along the first end of the PVC pipe toward the second end of the PVC pipe until said repair pipe extends across the cutout section and over the glued area at the second end of the PVC pipe; and
   h) positioning said repair pipe relative to the PVC pipe so a first overlap section of said repair pipe is over said glued area at the first end of the PVC pipe and a second overlap section of said repair pipe is over the glued area at the second end of the PVC pipe.

5. The method of claim 4, further comprising the step of accessing the pipe damage of the PVC pipe before said cutting step.

6. The method of claim 4, further comprising the step of cleaning, as necessary, the first end and the second end of the PVC pipe.

7. The method of claim 4, wherein said gap is approximately 1/32 of an inch.

8. The method of claim 4 further comprising a marking device on an outer surface of said tubular body of said repair pipe, said marking device selected so as to identify the standard nominal size of the PVC pipe for which said repair pipe is to be utilized.

9. The method of claim 4 further comprising a gripping element on an outer surface of said tubular body of said repair pipe.

10. A method of repairing pipe damage in a PVC pipe having a standard nominal size with an outside diameter associated with the standard nominal size of the PVC pipe, said method comprising the steps of:
    a) accessing the pipe damage of the PVC pipe;

b) cutting the PVC pipe near the pipe damage to obtain a cutout section, said cutout section defining a first end of the PVC pipe in spaced apart relation to a second end of the PVC pipe;
c) cleaning, as necessary, the first end and the second end of the PVC pipe;
d) providing a repair pipe having an elongated tubular body with repair length defined by a first end and a second end thereof, said repair length selected so as to exceed said cutout section plus a first overlap length at the first end of the PVC pipe and a second overlap length and the second end of the PVC pipe, said tubular body having an inside diameter selected so as to be only slightly greater than the outside diameter of the PVC pipe so as to provide a gap between said repair pipe and the PVC pipe;
e) placing said first end of said tubular body of said repair pipe over an outer surface at the first end of the PVC pipe;
f) sliding said repair pipe along the outer surface of the PVC pipe until said second end of said tubular body is slid past the first end of the PVC pipe to provide an exposed area at the first end of the PVC pipe;
g) applying an adhesive to all or part of said exposed area to define a glued area of the PVC pipe;
h) applying said adhesive to an exposed area at the second end of the PVC pipe to define a glued area at the second end of the PVC pipe;
i) sliding said repair pipe along the first end of the PVC pipe toward the second end of the PVC pipe until said repair pipe extends across the cutout section and over the glued area at the second end of the PVC pipe; and
j) positioning said repair pipe relative to the PVC pipe so a first overlap section of said repair pipe is over said glued area at the first end of the PVC pipe and a second overlap section of said repair pipe is over the glued area at the second end of the PVC pipe.

11. The method of claim 10, wherein said gap is approximately 1/32 of an inch.

12. The method of claim 10 further comprising a marking device on an outer surface of said tubular body of said repair pipe, said marking device selected so as to identify the standard nominal size of the PVC pipe for which said repair pipe is to be utilized.

13. The method of claim 10 further comprising a gripping element on an outer surface of said tubular body of said repair pipe.

* * * * *